Oct. 23, 1923.  
H. E. MORTON  
MAGNETIC CHUCK  
Filed Oct. 14, 1921  
1,471,624  
3 Sheets-Sheet 3
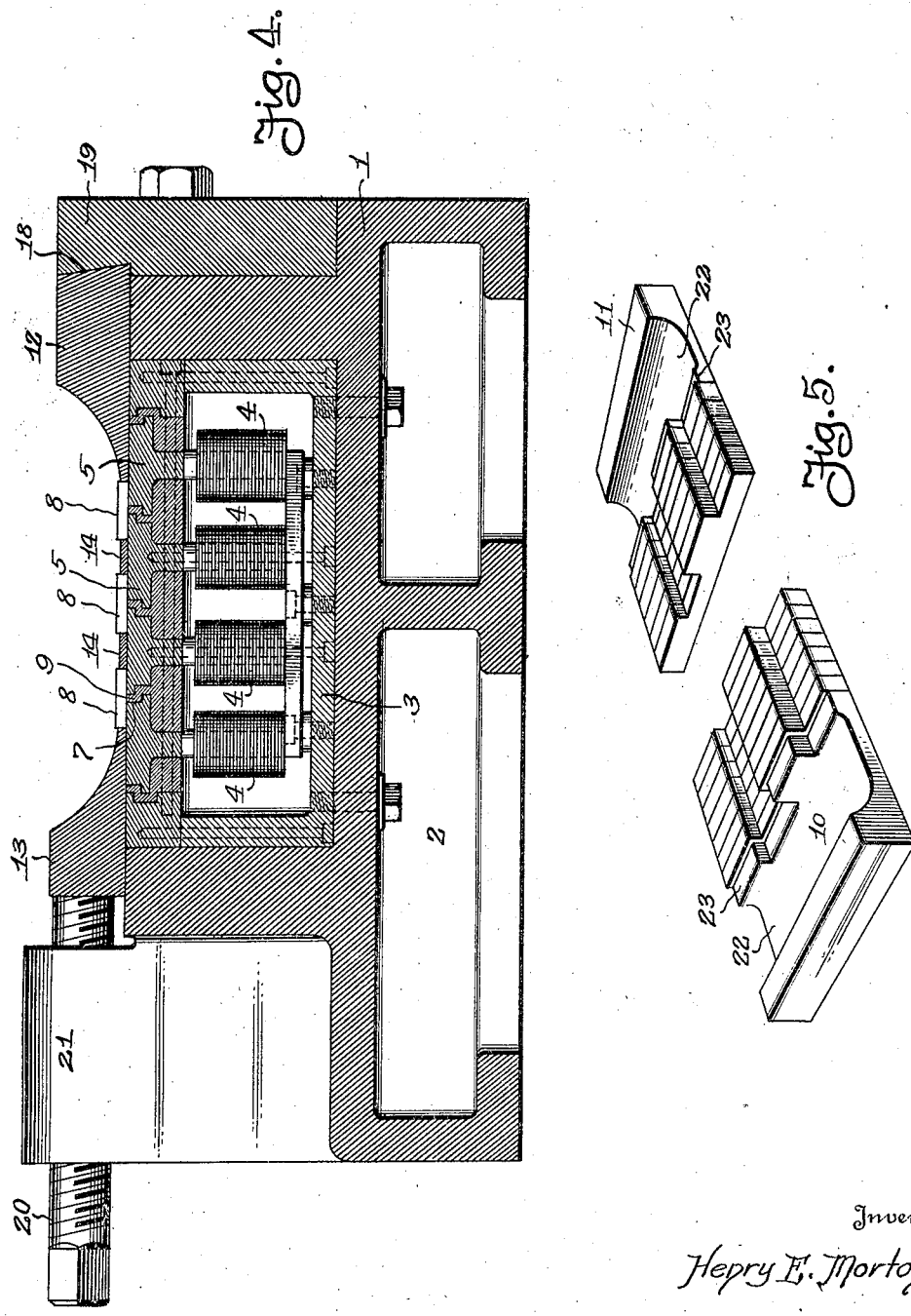
Inventor  
Henry E. Morton,  
By  
Attorneys Patented Oct. 23, 1923.

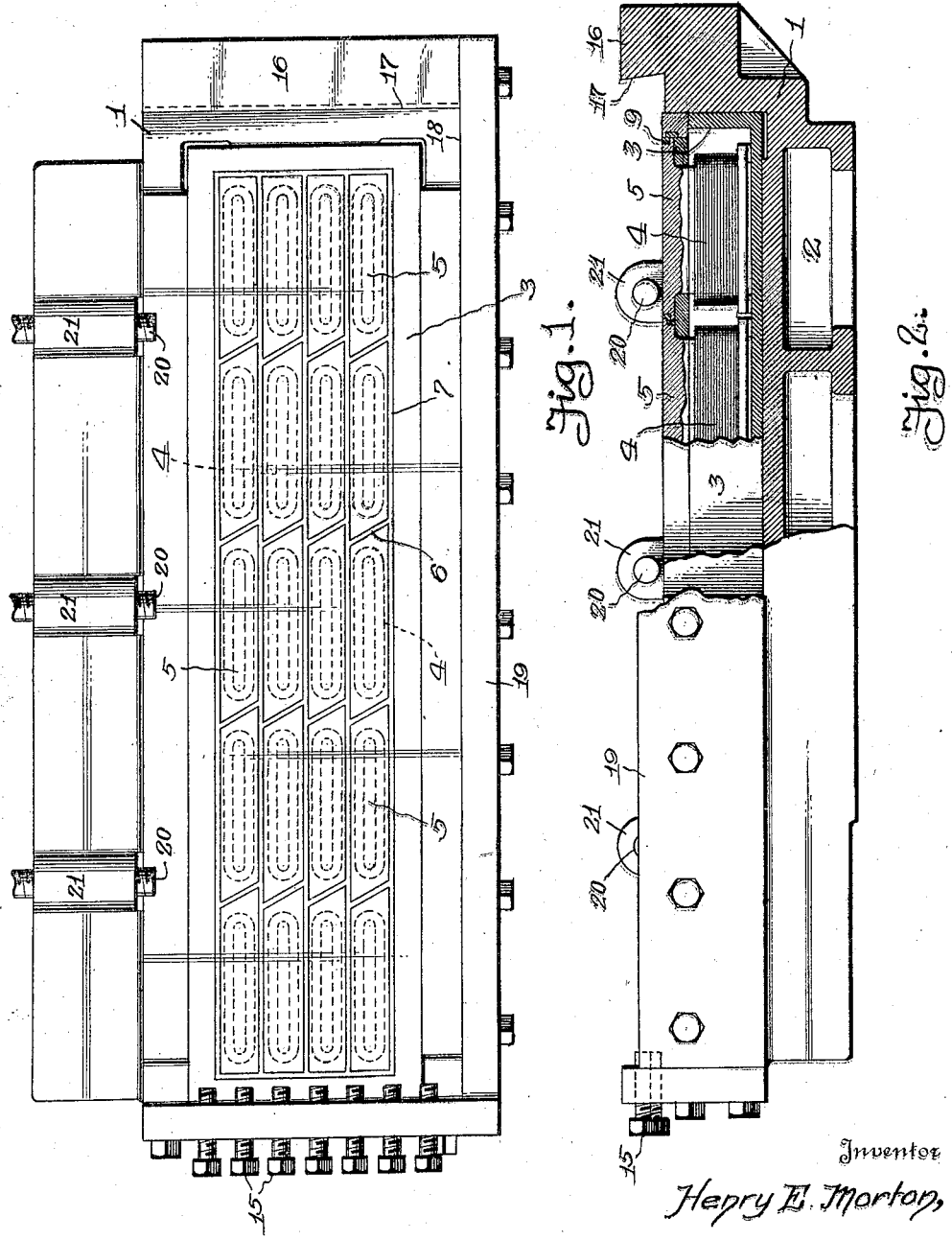

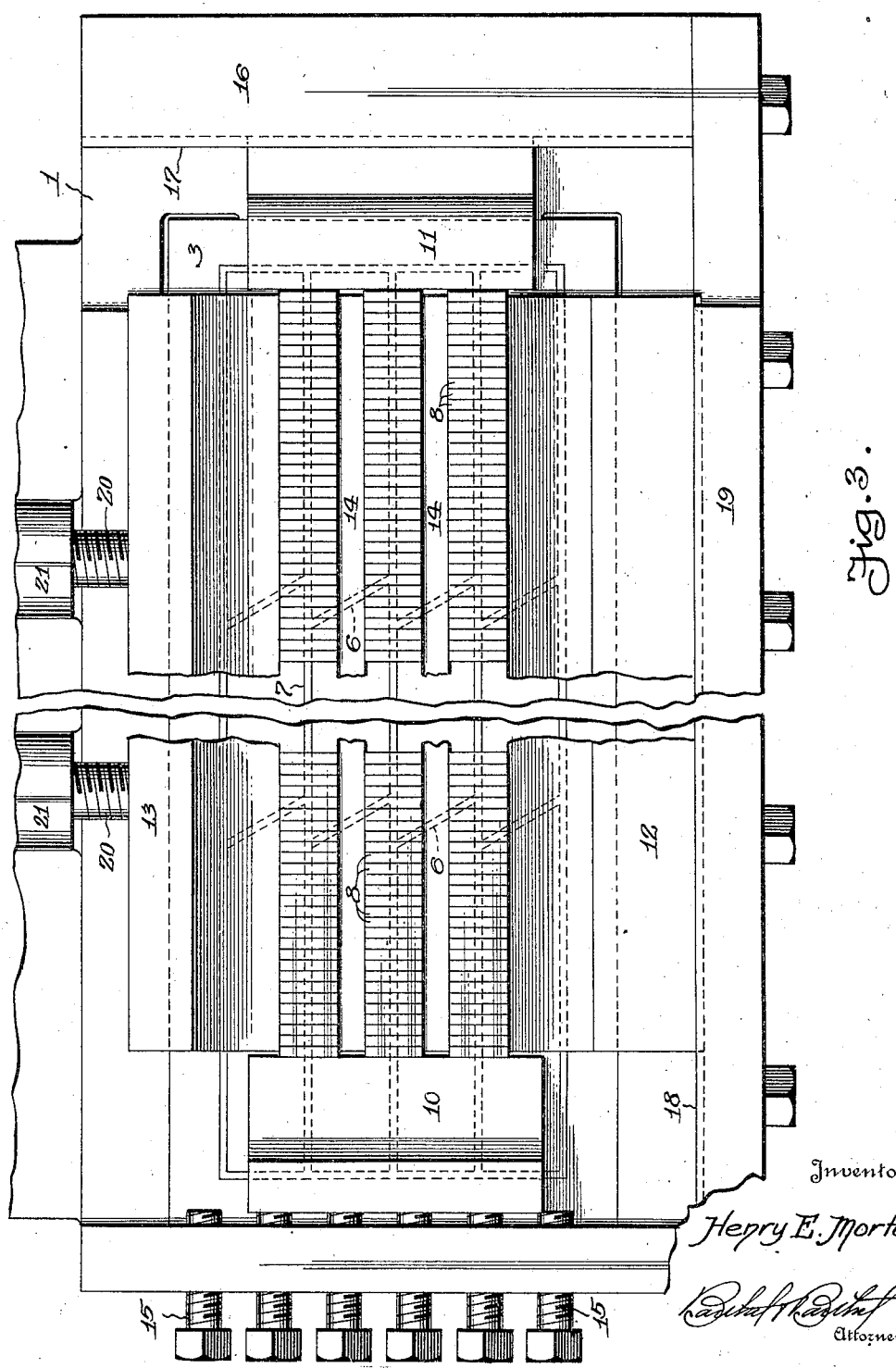

1,471,624

UNITED STATES PATENT OFFICE.

HENRY E. MORTON, OF MUSKEGON, MICHIGAN.

MAGNETIC CHUCK.

Application filed October 14, 1921. Serial No. 507,620.

*To all whom it may concern:*

Be it known that I, HENRY E. MORTON, a citizen of the United States of America, residing at Muskegon, in the county of Muskegon and State of Michigan, have invented certain new and useful Improvements in Magnetic Chucks, of which the following is a specification, reference being had therein to the accompanying drawings.

In the construction of magnetic chucks the magnetic face of the chuck is made up of a plurality of sections which are insulated, one from another, and each connected with a magnetic coil, said coils being positive and negative coils alternately arranged, so that a piece of work placed upon this face and bridging the gap will be held magnetically in place thereon.

The so called air gap of such chuck faces is usually arranged so that the work will bridge a major portion thereof, the pieces of the work extending transversely of the portions of the gap which are of greatest length, but in every known instance, the short connecting portions of the gap extend in such relation to the longer portions, that at certain points, small pieces of work if arranged in normal position relative to the longer portions of the gap would lie directly over these short connecting portions and would not effectually bridge the gap and be securely held magnetically.

It is an object of this invention to provide a magnetic chuck of extended face area which will effectually hold a large number of comparatively small pieces of work as well as work covering the entire or a large portion of the face, the air gap of said face being so arranged that none of a plurality of small pieces of work, if placed thereon in normal position, will come directly over throughout its length, any portion of the gap without bridging the same and will therefore be effectually held.

A further object is to provide clamping means adapted to cooperate with such magnetic means for holding the work in place upon said face with sufficient security to permit of forming the work by means of a suitable tool projected across the work parallel with said face.

It is also an object to provide certain other new and useful features which make the device particularly adaptable for holding a large number of small pieces of work and increase its utility.

With the above and other ends in view, the invention consists in the matters hereinafter set forth and more particularly pointed out in the appended claims, reference being had to the accompanying drawings, in which—

Figure 1 is a plan view of a chuck illustrative of the invention;

Fig. 2, a side elevation of the same with portions broken away and in section to more clearly show the construction;

Fig. 3 is an enlarged plan view of the chuck with portions broken away to shorten the figure and showing a large number of small pieces of work held in place on the face of the chuck;

Fig. 4 is a transverse vertical section through Fig. 3, and

Fig. 5 is a perspective view illustrative of a form of work adapted to be held by the chuck and also showing in perspective, suitable end filler blocks for assisting in holding the work.

While a device of a particular form and arrangement is illustrated in the drawings, it will be understood that the same is merely illustrative of the invention and that the construction may be modified within the scope of the appended claims to suit the work in hand.

Chucks embodying this invention will usually be made up in large sizes and with a magnetic face of rectangular form as the object of the invention is to provide a chuck which will hold a large number of small pieces of work as well as large pieces so that the chuck may be used in connection with a planer, draw cut shaper, or other large metal working machine to hold a large number of small pieces in such a manner that they may all be formed by the cutting tool as though they were but a single piece and thus greatly facilitate the operation of milling, planing, or otherwise forming small metal pieces where it is desired to shape a large number of these pieces. It is also desirable to provide clamping means in connection with the magnetic means for holding such small pieces of the work so that these pieces may be tightly and accurately clamped together in a row or series of rows so that the cutting tool may be projected across all of the pieces of each row as though there were but a single piece, and further it is desirable that this clamping means be such that it will hold firmly a large number of small pieces to be given any desired form, such for instance as the irregular form shown in Fig. 5, which is merely illustrative of the kind of work which is adapted to be held by a chuck embodying the invention.

Magnetic chucks commonly comprise a body or holder which is recessed to receive a magnetic chuck body containing the several magnetic coils, and as illustrated in the drawings such a body or holder is indicated by the numeral 1, said body being faced off on its lower side to seat upon the table or other part of the metal working machine to which the chuck is adapted to be secured in use, said body being provided with the usual flanged recess 2 in its lower side by means of which the body may be held by bolts or other means engaging these recesses in the usual manner. In the upper side of the body is formed a rectangular recess to receive the usual rectangular casing 3 of the magnetic chuck, proper, said casing fitting snugly within the recess and containing a plurality of magnetic coils 4 arranged in transverse and longitudinal rows, said coils being positive and negative coils preferably arranged in alternate relation in both transverse and longitudinal rows. The magnetic face of the chuck or the face upon which the work is adapted to rest, is made up of a plurality of pole pieces or plates 5, there being a pole piece or plate for each coil carried by or electrically connected to the core of the coil in the usual manner, and these several pole plates are insulated one from another, to provide what is commonly known as the air gap which is adapted to be bridged by the work placed upon this face of the chuck so that the magnetic lines of force may pass from a positive to an adjacent negative magnet through the work and thus hold it firmly in place upon the chuck face. This gap comprises longitudinal portions extending from end to end of the chuck face between the several longitudinal rows of the face plates 5, and also cross connecting portions 6 connecting the several longitudinal portions 7 between the ends of the several face plates. If small pieces of work are to be effectually held by the magnets upon the chuck face, these pieces may bridge the short or the long runs of the gap between adjacent positive and negative magnets and these pieces of work, as illustrated at 8 in Fig. 3, are therefore normally arranged side by side in longitudinal rows with each piece extending transversely of a long run 7 of the air gap.

If the cross connecting portions of the air gap be at right angles to the longitudinal portions as is the common arrangement, certain of the pieces of work which come over the cross connecting portions of the air gap would not bridge such gap and be securely held by magnetic force, and therefore when the forming tool is projected across the several pieces of work such pieces which are not securely held would be displaced and the whole row thus disintegrated. It is therefore essential that every small piece of work be held down by the maximum strength of the magnets, and to insure such bridging of the gap by the work and the full holding force of the magnets thereon, the transverse connecting portions 6 of the gap are extended between the longitudinal portions 7 in a diagonal direction, that is, a direction other than at right angles to the longitudinal portions of the gap. When the gap is thus constructed there will be no place throughout its length where a small piece of work may be laid thereon at right angles thereto and come directly over another portion of the gap without effectually bridging the gap between adjacent magnets. An essential feature of this invention is therefore the arrangement of the air gap with portions of the gap which are of lesser length extending at other than right angles to those portions which are of greater length.

As illustrated in Fig. 2 this air gap between the several pole pieces 5 may be filled with any suitable insulating material indicated at 9 to provide a smooth continuous face for the chuck upon which the work is adapted to be placed. Suitable electrical connections (not shown) are provided for supplying current to the several coils and suitable means, also not shown, is provided for controlling the current, all arranged in an old and well known manner.

Suitable clamping means is carried by the body 1 to clamp the work so that the several small pieces will be brought into and held in firm contact with each other. This clamping means comprising end filler blocks 10 and 11 adapted to engage the ends of the longitudinal rows of the pieces of work 8, and similar side filler blocks 12 and 13 are provided to engage the rows laterally, intermediate filler strips 14 being provided between the rows where the pieces of work are of such a length that such strips become necessary in order to space the rows apart, that these pieces may be located directly over the longitudinal portion 7 of the air gap. Carried by a flange on one end of the body 1 is a series of set screws 15 engaging screw-threaded openings in the flange and extending therethrough into engagement with the end filler block 10. The opposite end of the body 1 is provided with an upstanding flange or rib 16 forming an abutment for the end filler block 11 and the inside face or edge 17 of this abutment is preferably undercut slightly or formed at a slight inclination to the perpendicular so that when endwise pressure is put upon the rows of the pieces of work to force them against the filler block 11 and force this filler block into engagement with the abutment, the tendency of this force will be to cause the filler block 11 to more closely engage the face of the chuck, and in a like manner the filler block 12 is formed to engage the undercut side 18 of an abutment 19 secured to the longitudinal side edge of the body 1, and the opposing side filler block 13 is engaged by clamping screws 20 passing through screw-threaded openings in suitable bosses 21 provided upon that side of the body. The several filler blocks may be of any desired thickness but must be cut away along their edges which engage the work so that these blocks will not interfere with the cutting tool in forming the work.

As illustrated in Fig. 5 the end filler blocks 10 and 11 may have formed ends to conform to the particular irregular shape into which the work is to be formed so that any upstanding portion of the work will be properly supported by these formed end portions of the blocks. These blocks are also cut away as at 22 between their formed end portions 23 and the outer ends of the blocks to provide clearance for the tool and for the chips of the metal cut from the work by the tool.

By the use of the magnetic chuck described, a very large number of small pieces of metal may be held in place by the chuck and simultaneously formed by a cutting tool. These small pieces of work may be arranged side by side in one or more longitudinal rows each row extending longitudinally of a longitudinal portion 7 of the air gap and bridging the gap. In operation, after a row or rows of pieces of work have been properly positioned upon the face of the chuck the current is turned on and these pieces are drawn into firm contact with the face of the chuck. The end and side filler blocks are then moved to clamp the rows both longitudinally and transversely, thus moving the several pieces into firm contact with one another while they are being held magnetically. The accurate positioning of these small pieces of work is therefore quickly secured, all being first drawn down evenly into firm contact with the face of the chuck and then clamped both longitudinally and transversely to accurately align them and to assist in holding them in place while being formed by the machine tool.

Obviously, changes may be made in the form of clamping means, the size and proportion of the parts or the shape and details of construction of the chuck within the scope of the appended claims, without departing from the spirit of the invention, and I do not therefore limit myself to the particular form or arrangement shown.

What I claim is:—

1. In a magnetic chuck, the combination of a plurality of electro-magnets, and a plurality of pole pieces, one for each magnet, and together forming the work engaging surface of the chuck, said pieces being arranged in spaced relation to form an insulating gap surrounding all of said pieces with portions of the gap extending longitudinally of the face and transverse portions connecting the longitudinal portions, said connecting portions extending in a direction other than at right angles to the longitudinal portions.

2. In a magnetic chuck the combination of a plurality of electro-magnets, and a plurality of oblong pole pieces, together forming the work engaging face of the chuck, said pole pieces being insulated one from another and arranged in parallel rows extending longitudinally of the chuck face with portions of the insulating gap extending longitudinally of the chuck and cross-connecting portions at the ends of said pole pieces extending in a direction other than at right angles to the longitudinal extending portions of the gap.

3. In a magnetic chuck, the combination of a chuck body, a plurality of electro-magnets in said body, a pole piece for each electro-magnet, said pole pieces together forming the work engaging face of the chuck and said pole pieces being insulated from one another and arranged in longitudinal rows, filler blocks to engage the work upon the face of the chuck and held in contact with said face by said electro-magnets, and means carried by the chuck body for moving the filler blocks to clamp the work.

4. In a magnetic chuck, the combination of a chuck body, a plurality of electro-magnets in the chuck body, an oblong pole piece for each electro-magnet, said pole pieces together forming the work engaging face of the chuck, said pole pieces being arranged in longitudinal rows with an insulating gap surrounding each pole piece, the portions of the gap at each side of the pole pieces extending longitudinally of the chuck face with the connecting portions of the gap at the ends of the pole pieces extending in a direction other than at right angles to the longitudinal portions, side and end filler blocks to engage the work on the chuck face, and means for moving said blocks to clamp the work while held in place upon the face of the chuck by said magnets.

5. In a magnetic chuck, the combination of a chuck body, a plurality of electro-magnets within the body and an oblong pole plate for each electro-magnet, said plates being arranged end to end and side by side in spaced relation in rows extending longitudinally and transversely of the chuck, said plates together forming the work engaging face of the chuck, and insulated from one another, forming a gap surrounding each plate, the portions of the gap between the ends of the plates extending in a direction other than at right angles to the portions of the gap between the longitudinal rows of plates, side and end filler blocks having formed inner edges to engage the work upon the face of the chuck, abutments on the chuck body to engage certain of said filler blocks, and means carried by the chuck body for moving the other of said filler blocks to clamp the work while being held magnetically upon the face of the chuck.

In testimony whereof I affix my signature in presence of two witnesses.

HENRY E. MORTON.

Witnesses:
ANNA M. DORR,
LEWIS E. FLANDERS.